United States Patent [19]

Gutierreza Atencio

[11] 4,279,539
[45] Jul. 21, 1981

[54] DAM WITH TRANSFORMABLE HYDROENERGETIC ARRANGEMENT

[76] Inventor: Francisco J. Gutierrez Atencio, Garcia 3101, Diamante Prov. Entre Rios, Argentina

[21] Appl. No.: 67,318

[22] Filed: Aug. 17, 1979

[51] Int. Cl.³ .............................................. E02B 9/08
[52] U.S. Cl. ...................................... 405/76; 290/53; 405/78
[58] Field of Search ............... 405/75, 76, 78; 290/42, 290/43, 53, 54

[56] References Cited

U.S. PATENT DOCUMENTS

| 4,159,188 | 6/1979 | Atencio | 405/78 |
| 4,165,467 | 8/1979 | Atencio | 405/75 X |

*Primary Examiner*—David H. Corbin

*Attorney, Agent, or Firm*—Emory L. Groff, Jr.

[57] ABSTRACT

Transformable hydroenergetic arrangement for a fluid storing dam having a conduit for directing passage of fluid flows therethrough, said fluid directing conduit being dually shaped as a frustum spatial geometrical configuration flaring from the center line of the dam to both of the dam's opposing faces with gated fluid flow controlling means provided along the center line and passing coincidently through the smaller transverse cross-sectional area of the conduit. A hydromotive assembly is alternatively positioned in combination with either flared portion of the dually-flared conduit. The hydromotive assembly includes a turbine runner disposed within a diffuser tube of a body having a flared extension surrounding the diffuser tube and terminating in an open end allowing evacuation of fluid flows.

12 Claims, 2 Drawing Figures

DAM WITH TRANSFORMABLE HYDROENERGETIC ARRANGEMENT

The present invention relates to a transformable hydroelectric arrangement for fluid storing structures such as dams, hydraulic flood controlling structures, irrigation dams, navigable waterway controlling structures, unused lockage structures, and the like. The involved hydroelectric arrangements are constructed to perform either in the electric energy generation mode or alternatively, in the energy accumulation mode as when acting in a reverse mode.

The present structure may also be employed in coastal tidal schemes so as to perform in the direct flow (ebb tide cycle) during the emptying of the basin, or alternatively, in the reversed flow (flood tide cycle) during the filling of the basin. In both instances, the most efficient hydraulic performance is achieved.

Hydroelectric assemblies for electric energy production or for energy accumulation in pumped storage systems are well known in the art. The aim of these hydromotive assemblies is to provide for the conversion of the inherent gravitational energy of the mass of fluid stored in the reservoir and positioned behind such dams, into electric energy to feed surrounding electrical networks.

In the reverse mode, the available inherent gravitational energy is increased for future use by using electric energy from other generation sources to pump fluid into the reservoir thus maximizing the electric power energy interchange pattern defined within a given electrical system network serving a geographical area.

The need to provide for the above conversion is particularly imperative at the present energy conscious time and the situation is especially significant in low-head hydraulic systems, and in future tidal powered projects, because these environments are usually located in the vicinity of the most demanding electrical markets.

A shortcoming of many planned hydroelectric projects and existing dams without hydroelectric production, is associated with the inherent low-head hydraulic efficiency of the energetic transformation. The extremely variable and fluctuating seasonal river flow hydrological conditions are of importance too. In droughts, the river flow is so reduced that nearly all the firm capacity of the hydroelectric plant is lost and the plant must be limited to perform as a pure peak power station in the summer time when demands of the air-conditioning electric load is of paramount importance during the daylight hours. This demand does not exist during operating of the plant during the evening hours. This type of operation compounds for a very short annual life operativeness of the hydroelectric machines and results in an increased cost of the hydroelectric performances.

By the present invention, hydroelectric power production will be enhanced and available during most demanding circumstances. Efficiency of the energetic performance will improve too. Actually, pumped storage schemes have an energetic yield of about 70% to 75% under the best circumstances. They are limited to Francis reversible pump-turbines of large powered output.

The present scheme, on the other hand, proposes better energetic transformation performances. Yields of about 80% can be expected and with machines having modest powered outputs and sited close to the vicinity of populated areas.

The above is achieved by the provision of a very compact arrangement comprising a controllably displaceable or movable hydroelectric assembly designed to be alternatively positioned at either side of a damming structural arrangement. This assembly may be readily positioned into a generation use position with the associated upstream face of a dam structure or, moved therefrom to an accumulation use position when associated with the downstream face or side of the dam. The foregoing is achieved according to the dictates of the variable hydrological conditions of the river, combined in turn with the variable conditions of the regional electrical markets.

The present novel arrangement of reversible low-head hydroelectric generation provides a unique flexibility providing for either pure hydroelectric generation or combined hydroelectric generation/accumulation and may be adapted to river watersheds which heretofore did not qualify as an energetically profitable site.

Another area which may profit from the present novelty concerns tidal powered projects. Until now, the tidal powered station at Rance (France) and the planned tidal projects at Fundy Bay (Canada) are limited to the single cycle/single basin concept. If the dual cycle/single basin concept could be introduced in an economical manner then, a significant achievement would be realized.

The present invention achieves the above because of two main advantages. First, the reversibility pattern permits operation in a generation mode along both the direct ebb tidal cycle during emptying of the basin, as well as along the flood indirect tidal cycle during the filling of the basin due to the utilization of horizontally disposed turbines having a fixed-bladed propeller which saves a good percentage of the financial investment on tidal installions. Fixed bladed propellers permit in turn, an increased diameter for the turbine design thus permitting higher powered machines, which in turn, adds to the economics of the development. And secondly, the reversibility pattern permits the reversion of the venturi conduit associated with the hydromotive assembly thereby increasing the efficiency yields from the 75% available at Rance up to between 85% and 90% available with the present invention when a pure tidal generation performance occurs along both ebb and flood cycles.

It is proposed that the present hydromotive design incorporate capsule-mounted hydroelectric generator sets having fix-bladed propeller turbines installed in tidal powered projects. However, tube concepts may also be employed, following the Harza developments in which the generator is annularly definded around the turbine and externally positioned relative the fluid conveying conduit. In pumped-storage schemes, the turbine can be either of the fix-bladed type or of the Kaplan type, while the generator will operate as a motor-generator.

Preferably, the hydromotive set is combined to form a unitary assembly including a substantially rectilinear draft tube or diffuser accounting for 50% of the overall linear extent of the diffuser assembly. The remaining 50% is provided by a diffuser incorporated within the body of the dam. When the two conduit sections are combined, a gated structural arrangement is generally defined between the two portions of the movable diffuser incorporated in the hydromotive set and the fixed portion belonging to the dam body. The hydromotive assembly is alternatively positioned within two flared recesses defined within the upstream and downstream side of the dam fluid flow passageway which recesses are separated by the gated arrangement. In this way a unique movable body is realized without any movable diffuser bodies being utilized. This produces a rugged, solid, compact, engineered design very well suited to the agressiveness of the media which surrounds tidal schemes.

Cranage facilities, or other displacing means, are provided for the purposes of re-locating the hydromotive assembly from one side of the dam to the other side. Lockage structures could be used, when available, to allow passage by navigation of the hydromotive assembly in such an operation.

Accordingly, one of the objects of the present invention is to provide an improved reversible hydroelectric arrangement offering superior flexibility in a low flow river environment which inherently involves a drought condition.

A further aim of the present invention is to provide a pumped storage scheme for low hydraulic heads, and having a more efficient performance in the energetic transformation than presently available pumped-storage schemes.

Still another object of the present invention is to provide an improved tidal powered scheme concept which will permit the economical designing of dual cycle/single basin schemes with fixed bladed propeller turbines, and with only one movable body component.

Still another object of this invention is to improve actual energetic outputs expected from tidal powered apparatus.

Another object of this invention is to provide a dam structure including a gated engineered arrangement which is included within the body of the dam, and in the smaller cross-transversal area of the fluid flow conduit which directs the fluidic displacement therethrough.

The above produces an economic form of a gated structual design, and induces the possibility of hydroelectric sets having fixed distributor vanes, being regulated by a downstreamly positioned gated arrangement yielding a powered variable output. In other terms, fluidic flows passing through the hydromotive assembly are regulated by the gated arrangement and not by movable wicket gates of a distributor upstreamly defined in relative position to a turbine. The foregoing produces a very economic design in the manufacture of horizontalized hydromotive sets. This novelty is applicable to both reversible low-head hydroelectric schemes and tidal powered schemes.

Still another aim of the present invention is to provide a reversible hydroelectric arrangement, or tidal powered arrangement in which only one movable body-component is involved, thus superseding present designs in which three movable body components were designed and committed to realize this performance.

With these and other objects in view which will more readily appear as the nature of the invention is better understood, the invention consists in the novel construction, combination and arrangement of parts hereinafter more fully described, illustrated and claimed.

A preferred and practical embodiment of the invention is shown in the accompanying drawing in which.

Similar reference characters designate corresponding parts throughout the several figures of the drawing.

Figure 1:
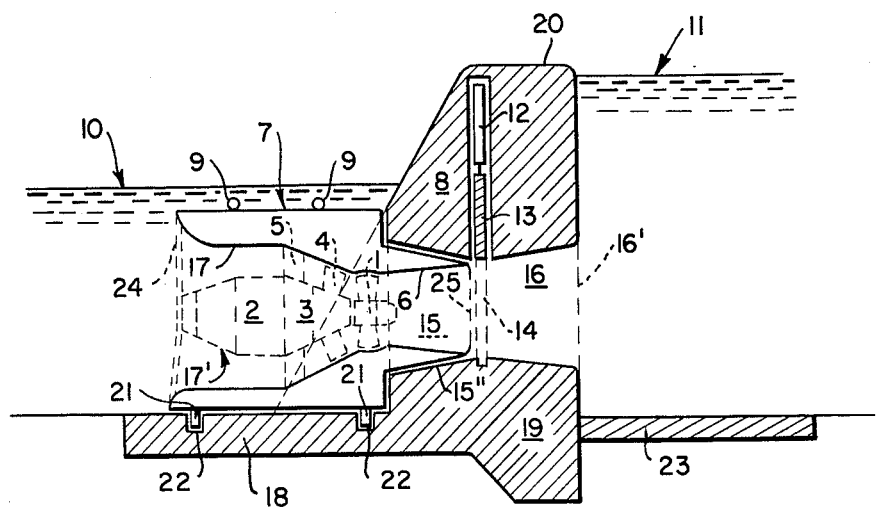
FIG. 1 is a longitudinal vertical view of the present invention as it appears when the hydromotive assembly is disposed in an energy accumulation mode, in a pure hydroelectric river development.
Figure 2:
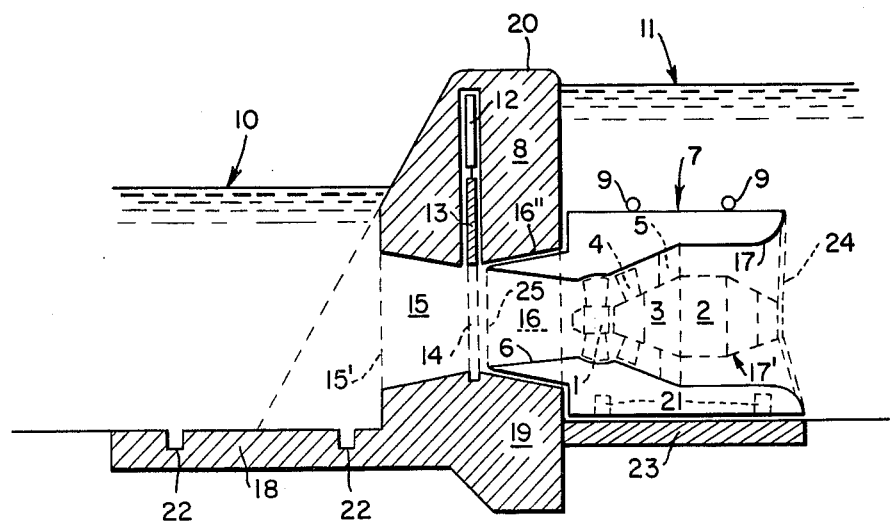
FIG. 2 is a longitudinal vertical view of the present invention as it appears when the hydromotive assembly is disposed in a reversed energy generation mode, in the same hydro development.

Referring now to the drawing, FIGS. 1 and 2, the present invention will be seen to include a hydromotive assembly 7 comprising an integral unit having a hydroelectric set 17' and a diffuser conduit 6, both being disposed within the assembly body 7. The hydromotive assembly, or energy transformation unit 7, comprises a turbine 1 joined to an electric generator 2 by a connecting body 3. Being a transformation unit, the element 1 is actually a pump-turbine and is joined to the element 2 which is an electric motor-generator, by means of the connecting body and shaft arrangement 3.

Intermediate the turbine 1 and generator body 2 are the movable-bladed distributor 4 (or optionally, fixed-bladed) and the fixed-bladed stay ring 5. The entire electric generation sub-assembly 17' is preferably enclosed in hermetic form such as by one surrounding capsule and is preferably suitably affixed within the interior of the longitudinally extending conduit serving as a fluidic flow circulation path through the assembly 7. This conduit is defined by the interior lateral wall 17 in an upstream portion relative the turbine runner 1, and the wall 6 in the diffuser portion which is downstreamly defined relative the turbine runner 1. This conduit extends between a first inlet open end 24 and a second outlet open end 25 disposed adjacent said diffuser. Disposed in a combined manner adjacent the first inlet open end 24 are stop log devices and movable cleaning devices cooperating therewith, to remove foreign matter (not shown).

Disposed in a surrounding manner adjacent the diffuser outlet open end 25 of the positioned hydromotive assembly conduit, and embodied within the dam body, is a movable gated fluid retaining means 13 running within slots 14 and actuated by motive means 12, all being integrally embodied within the main body 8 of the dam and extending above the fluid conduit 15–16 extending through the dam body 8.

The dam conduit 15–16 is dually flared from the smaller cross-sectional area 14 adjacent the slots to downstream open end 15' of the downstreamly defined flared section 15, and to the upstreamly sited open end 16' of the upstream flared portion 16 defined by frustum shaped walls 16", while the portion 15 is defined by the frustum shaped walls 15". The upper portion of the dam main body 8 is separated from the lower dam body 19 by the described conduit.

The dam body 8,19 includes a downstreamly extending section 18 having slots 22 to receive support extensions 21 operated outwardly from the body of the hydromotive assembly 7 when it is positioned on the downstream side of the dam. The hydromotive assembly is suitably maintained in proper combined relationship with respect to the face of the downstream conduit open end 15' by means of the plurality of extensible support members 21 suitably affixed to the slab 18.

An upstreamly defined slab 23 serves as a supporting structure for permitting resting of the assembly 7 above same.

Cranage means are engageable with the hoops 9 on the assembly body 7 for purposes of moving it from one side of the dam to the other side.

Water levels in both the reservoir side 11 and the tail-water side 10 are properly controlled by selectively closing the fluid flow passageway 15-16 engineered through the dam body 8,19 by means of the vertically displaceable gate 13 leading along the slots 14 defined within the smaller cross-transversal area of the dual flared conduit 15-16. Acting servomotor 12 is enclosed within the upper portion of the dam body 8 whereby floods may be conveyed over the dam's crest 20 without any interference.

To start the generation cycle, gate 13 is closed while the hydromotive assembly 7 is advanced within the flared portion 16 of the fluidic flow conduit defined in the upstream side of the dam, as shown in FIG. 2 of the drawing. The respective flared frustum portion of the hydromotive body 7, which extends to an open end 25 will be seen to fit very well in combination with the dam's conduit portion 16. Once open end 25 coincides with slots 14, and the hydromotive body 7 is rested atop slab 23 then, gate 13 is progresssively raised. If the distributor 4 is fixed and the turbine 1 has a fixed-bladed design, then water flow is controlled by partly raising the gate 13 until the generator 2 is synchronized to the associated network. After that point, the gate is fully opened and a full fluidic flow operates the turbine 1 to induce full generation powered output thereof. Reversing this procedure permits stopping the generation cycle.

Use of a movable wicket gated distributor 4 permits a more flexible operation, particularly in the case of isolated networks having variable electrical loads.

A Kaplan machine could be arranged to cooperate with such a movable wicket gated distributor, thus additionally flexibilizing the operation of the generation hydro set.

To start the accumulation cycle, gate 13 is lowered to close the conduit 15–16 and the hydromotive assembly 7 is removed from the dam's flared semi-conduit section 16 and then raised by cranage means and moved to the downstream side of the dam 8,19 or alternatively, removed by navigation along a lockage facility to the same downstream side of the dam. Then, the flared portion of set body 7 is combinably positioned within the flared semi-conduit section 15 of the dam's fluidic flow passageway while support members 21 are outwardly extended beyond the body 7 and combinably fitted within the slots or recesses 22 defined in the slab 18 as shown in FIG. 1 of the drawing.

Then, motor 2 is started while gate 13 is progressively opened to permit flowing fluids to be actuated within the hydromotive set conduit and to be discharged through the outlet open end 25 after being admitted by inlet open end 24.

Once again, a movable distributor having displaceable wicket gates 4, permits a more flexible pumping operation because of their relative location on the upstream side of the pump runner 1.

The foregoing represents a great departure in the pumped storage concepts available heretofore. It is known that regulation of the pumped flows is not available when a reversible Francis pump-turbine runner is engineered to be combined with only a motor-generator set.

The above procedures are reproduced when a tidal powered scheme is involved. But in such instances, only a generation set is involved in most circumstances, although a reversible pumped-generation set could, if desired, by engineered.

The ebb cycle produces generation when the unit is sited on the upstream side of the dam while, the flood cycle produces generation when the set is on the downstream side of the dam.

I claim:

1. In a fluid storing dam having a main structural body having opposite faces and including means for directing a fluidic flow therethrough, said directing means including a dam body conduit having a dually frustum shaped spatially geometrical configuration flaring substantially from inside said main dam body to both said dam opposite faces to define a pair of adjacent dam conduit branches; the improvement comprising, one or more hydromotive assemblies, each said hydromotive assembly having a conduit, a hydromotive power unit disposed with said assembly conduit for alternately acting upon or being actuated by fluidic flows through said assembly conduit, said assembly conduit having a first open end for admitting fluidic flows and a second open end for discharging fluidic flows, said hydromotive assembly selectively alternatively mounted against each said face of said main dam body with said second open end of said assembly conduit joined within one said dam conduit branch in alignment with the entire said fluidic flow directing means of said dam to form a continuous fluidic flow path through both of the combined hydromotive assembly and fluid storing dam.

2. A fluid storing dam according to claim 1 wherein, said hydromotive assembly is positioned upstream of said main dam structural body with said second end of said hydromotive assembly conduit positioned in alignment with said fluidic flow directing means of said dam and said hydromotive power unit operates in an electrical power generation mode.

3. A fluid storing dam according to claim 2 wherein, said dam is disposed in a tidal powdered installation and said electrical power generation mode is accomplished during an ebb cycle as the basin of water behind said dam is being emptied.

4. A fluid storing dam according to claim 1 wherein, said hydromotive assembly is securely positioned downstream of said main dam structural body with said second end of said hydromotive assembly conduit positioned in alignment with said fluidic flow directing means of said dam and said hydromotive power unit operates in an electrical power accumulation mode.

5. A fluid storing dam according to claim 4 wherein, said dam is disposed in a tidal powered installation and said electrical power accumulation mode is accomplished during a flood cycle as the basin of water behind said dam is being filled.

6. A fluid storing dam according to claim 1 wherein said dam is disposed in a tidal powered installation and said hydromotive assembly is secured and positioned downstream of said main dam structural body with said second end of said hydromotive assembly conduit positioned in alignment with said fluidic flow directing means of said dam and said hydromotive power unit operates in an electrical power generation mode during a flood cycle as the basin of water behind said dam is being filled.

7. A fluid storing dam according to claim 1 including, a smaller cross-sectional area intermediate the dual portions of said dam dually frustum shaped conduit, and gated fluid flow controlling means disposed within said conduit smaller area.

8. A fluid storing dam according to claim 1 wherein, the longitudinally extending axes of said dam flaring conduit branches are of substantially equal length.

9. A fluid storing dam according to claim 8 wherein, said hydromotive assembly including a body having an extension defining a frustum spatially geometrical configuration terminating in said assembly conduit second open end, said power unit including a turbine runner and said assembly body extension extends substantially from said turbine runner to said assembly conduit second open end.

10. A fluid storing dam according to claim 9 wherein, said assembly body extension provides a close mating fit when alternately mounted within either said dam conduit frustum branch with said assembly second end disposed substantially intermediate said dam conduit.

11. A fluid storing dam according to claim 1 wherein, said hydromotive power unit includes a turbine runner, said assembly conduit extending from said turbine runner to said second open end having an internal wall defining a diffuser tube and said diffuser tube having a flare substantially corresponding to the angle of said flared branches of said dam conduit.

12. A fluid storing dam according to claim 7 wherein, said gated means is disposed within the confines of said dam main body whereby flood flows may freely pass over said dam body.

* * * * *

UNITED STATES PATENT AND TRADEMARK OFFICE
CERTIFICATE OF CORRECTION

PATENT NO. : 4,279,539

DATED : July 21, 1981

INVENTOR(S) : Francisco J. Gutierrez Atencio

It is certified that error appears in the above–identified patent and that said Letters Patent are hereby corrected as shown below:

ON THE TITLE PAGE:

[19] Change "Gutierreza Atencio" to -- Gutierrez Atencio --.

Signed and Sealed this

Thirteenth Day of April 1982

[SEAL]

*Attest:*

GERALD J. MOSSINGHOFF

*Attesting Officer*     *Commissioner of Patents and Trademarks*